United States Patent [19]

Kaun et al.

[11] Patent Number: 4,714,661
[45] Date of Patent: Dec. 22, 1987

[54] MOLTEN CARBONATE FUEL CELL

[75] Inventors: Thomas D. Kaun, New Lenox; James L. Smith, Lemont, both of Ill.

[73] Assignee: The United States of America as represented by the United States Department of Energy, Washington, D.C.

[21] Appl. No.: 883,217

[22] Filed: Jul. 8, 1986

[51] Int. Cl.$^4$ .................. H01M 8/04; H01M 2/08
[52] U.S. Cl. ........................... 429/14; 429/16; 429/37; 429/38; 429/39
[58] Field of Search .................... 429/37–39, 429/16, 36, 14

[56] References Cited

U.S. PATENT DOCUMENTS

| | | | |
|---|---|---|---|
| 4,212,929 | 7/1980 | Grevstad et al. | 429/37 |
| 4,345,009 | 8/1982 | Fahle et al. | 429/38 X |
| 4,411,968 | 10/1983 | Reiser et al. | 429/41 |
| 4,514,475 | 4/1985 | Mientek | 429/37 X |
| 4,579,788 | 4/1986 | Marianowski et al. | 429/16 |
| 4,609,595 | 9/1986 | Nickols | 429/37 X |

Primary Examiner—Brian E. Hearn
Assistant Examiner—Stephen J. Kalafut
Attorney, Agent, or Firm—William Lohff; Hugh W. Glenn; Judson R. Hightower

[57] ABSTRACT

A molten electrolyte fuel cell with an array of stacked cells and cell enclosures isolating each cell except for access to gas manifolds for the supply of fuel or oxidant gas or the removal of waste gas, the cell enclosures collectively providing an enclosure for the array and effectively avoiding the problems of electrolyte migration and the previous need for compression of stack components, the fuel cell further including an inner housing about and in cooperation with the array enclosure to provide a manifold system with isolated chambers for the supply and removal of gases. An external insulated housing about the inner housing provides thermal isolation to the cell components.

4 Claims, 3 Drawing Figures

MOLTEN CARBONATE FUEL CELL

CONTRACTUAL ORIGIN OF THE INVENTION

The U.S. Government has rights in this invention pursuant to Contract No. W-31-109-ENG-38 between the U.S. Department of Energy and The University of Chicago representing Argonne National Laboratory.

BACKGROUND OF THE INVENTION

This invention relates to molten electrolyte fuel cells and more particularly to fuel cells having multiple enclosures which support and isolate individual cells in an array of cells and provide isolated gas chambers for providing fuel or oxidant gases to alternate cells in the array and for removing waste gases.

The fuel cell is a most promising technology for the alternative generation of electricity using low grade fuels. One type of fuel cell, known as the molten carbonate fuel cell as illustrative of the molten electrolyte fuel cell, consists of an anode made of a porous nickel alloy, a cathode made of a porous metal oxide, an electrolyte made of discrete submicron particles of $LiAlO_2$ and a liquid mixture of lithium and potassium carbonates, and electrically conductive current collector sheets. The electrolyte is interposed between and separates adjacent faces of the anode and cathode, and the current collector sheets are disposed adjacent the opposite faces of the anode and cathode and deliver respectively the positive and negative charges to the extended output circuit.

The fuel cell requires the continuing addition of fuel and oxidant to generate any electrical power. To accommodate this, the anode and cathode each has defined, by means of fabricated passageways or by its highly porous structural formation, a flow matrix for the passage of gases therethrough. A fuel gas (hydrogen and/or carbon monoxide, for example) is passed through the anode flow matrix and an oxidant (air) is passed through the cathode flow matrix. This provides at the anode, that the fuel gas reacts with carbonate ions from the electrolyte to form carbon dioxide and water, giving up electrons to the external circuit; and at the cathode, the carbon dioxide and oxidant react to form carbonate ions, accepting electrons from the external circuit.

Each cell generates about 0.8 of a volt, so that a practical fuel cell device will have many cells (50–1000) assembled in a single stack. The current collector sheets fit between the adjacent cells of a stack, electronically joining these cells together in a series electrical connection, while separating the cathode and anode structures and the reactant gases in the flow matrices thereof. External manifolds direct the fuel and oxidant gases as parallel gas flows to the cells, and collect the waste gas products from the cells. In a practical utilization of the fuel cell device, such as in a power plant, stacks with several hundred fuel cells are contemplated in a typical power supply.

The separator (bipolar current collector) sheets each respectively bears upon the electrolyte structure, "tile", to form a "wet" seal that separates the cell interior from the surroundings. Typically, the compression (i.e., 60 psi) of the stack components provides the primary means for maintaining the gases sealed at the edges, although even momentary release of stack compression can allow gas leakage that might quickly result in total failure of the fuel cell. Mechanical creep of the components over a longer term of operation can also promote gas leakage through the "wet" seals. Electrolyte migration between sandwiched components of a stack held within a common case confinement can reduce the stack efficiency (some cells "dry out" and some cells "flood") and could even lead to cell failure by shorting across the wetted area.

The exact mechanism by which the electrolyte migrates is not clearly understood. Nonetheless, it is known that the cells near the negative end of the stack become flooded while the cells towards the positive end of the stack become depleted or dry of molten electrolyte. Some have suggested that an electrical shunt current through the manifold gasket causes electrolyte migration toward the negative end of the stack. The depletion of electrolyte severely impairs the performance of the affected cells and greatly increases the overall resistance of the stack.

In addition to the above problems, it is also important to provide a relatively equal supply of fuel and oxidant gases to the respective electrodes of each of the plurality of cells.

Accordingly, one object of this invention is to provide a fuel cell construction that is easily fabricated, initially by forming modules or subassembly components which ultimately are assembled with other components to define the finished fuel cell.

A second object of this invention is to provide a fuel cell construction that is reliable in operation and capable of continued operation even with mechanical creep and the resultant reduction in the component thickness over time and/or possible shifting of the fuel cell components relative to one another.

A third object is to provide a molten electrolyte fuel cell in which the cell enclosures for an array of cells are assembled with an array housing to provide a plurality of isolated chambers to provide a source of fuel or oxidant gas and removal of waste gases.

An additional object of this invention is to reduce the compressive force placed on the fuel cell (MCFC) stack during operation. Mechanical creep is a problem with long ter operation of the MCFC. Component thicknesses are reduced with conditions of high temperature (550°–750° C.) and compressive loading (50–100 psi). Without the requirement of compressive loading to maintain the "wet-seals", mechanical creep of all components is significantly reduced or eliminated. Long, stable MCFC operation can be expected.

A specific object of this invention is to provide an electrolyte module formed of electrolyte-support material and a refractory spacer (of alumina, $Al_2O_3$, or lithium aluminate, $LiAlO_2$, for example) arranged as an annulus around the electrolyte-support material, where each is sandwiched between separate sheets of aluminized steel; where the sheets are perforated across their faces within the area defined by the annular spacer; and where the edges of the aluminized sheets proJect peripherially beyond the annular spacer.

Alternatively, another object of this invention is to provide a means for fabricating such an electrolyte module, where in a first step of fabrication, the sheets are sandwiched on the sides of the annular spacer and the same is cured at high temperatures for a short duration (800° C. for 1 hour or less) to fuse or bond the annular spacer and two sheets together. In a next step of fabrication, an electrolyte-support matrix ($LiAlO_2$) as a slurry is doctored (or extruded) through the perforations into the confines within the annulus and between the two electrolyte-support sheets. This subassembly is cured again at a high temperature and for a short duration (700° C. for 1 to 3 hours) to form a gas-tight seal between the sheets, the electrolyte-support and the alumina spacer.

A further object of this invention is to provide a composite fuel cell design having many similar electrolyte-modules and electrode flow matrices alternately stacked; where the peripheral edges of adjacent pairs of the electrolyte-modules can be welded individually and successively, or simultaneously or as a group to the metallic current collector sheets so as to seal the gases and respective anode or cathode electrode material therewithin.

SUMMARY OF THE INVENTION

Briefly, this invention relates to a molten electrolyte fuel cell comprising a plurality of cells and cell enclosures to provide a stacked array of cells in a unitized fuel cell stack with the electrodes of each cell being isolated except for access to isolated chambers providing a supply of fuel or oxidant gases in a crossflow pattern or a path for removal of waste gases also in a crossflow pattern. An inner housing is provided about the collective cell enclosures with sealed boundaries between the collective cell enclosures and inner housing to provide the above described isolated chambers. An insulated outer housing is provided about the inner housing with openings for tubular connection to gas inlets and outlets and electrical connection for external transfer of electrical energy.

DETAILED DESCRIPTION OF THE PREFERRED EMBODIMENT

Figure 1:
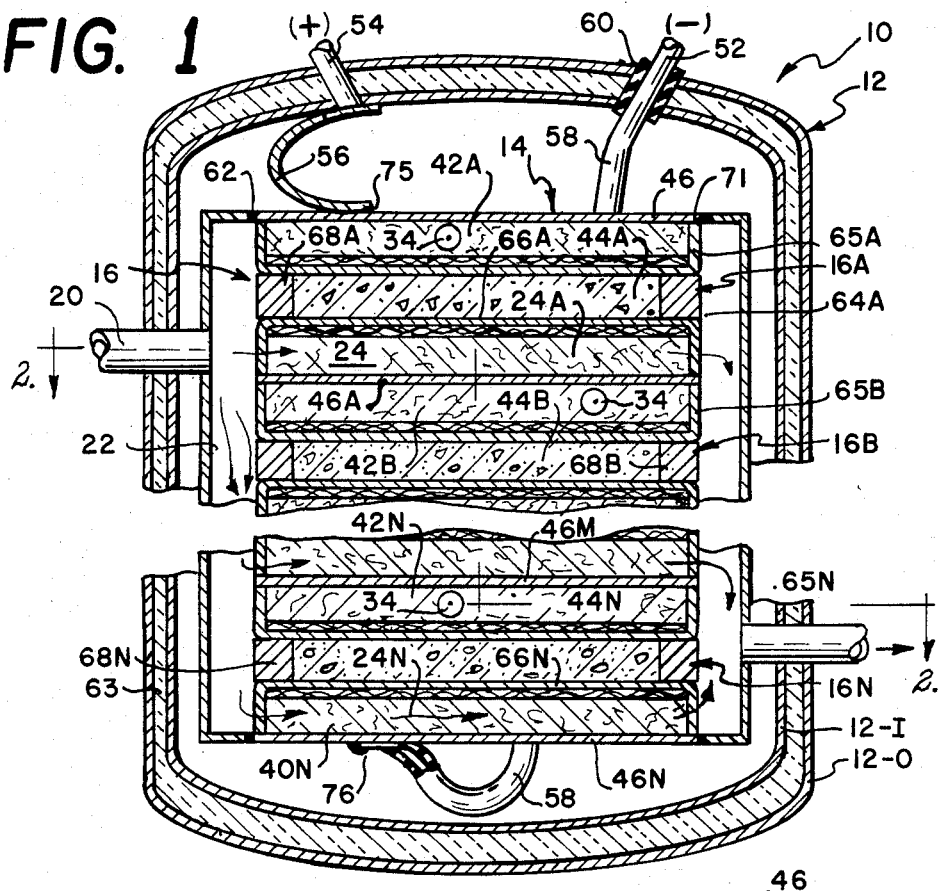
FIG. 1 is a side elevational sectional view of a typical molten carbonate fuel cell, shown having a preferred embodiment of the subject invention incorporated therein.
Figure 2:
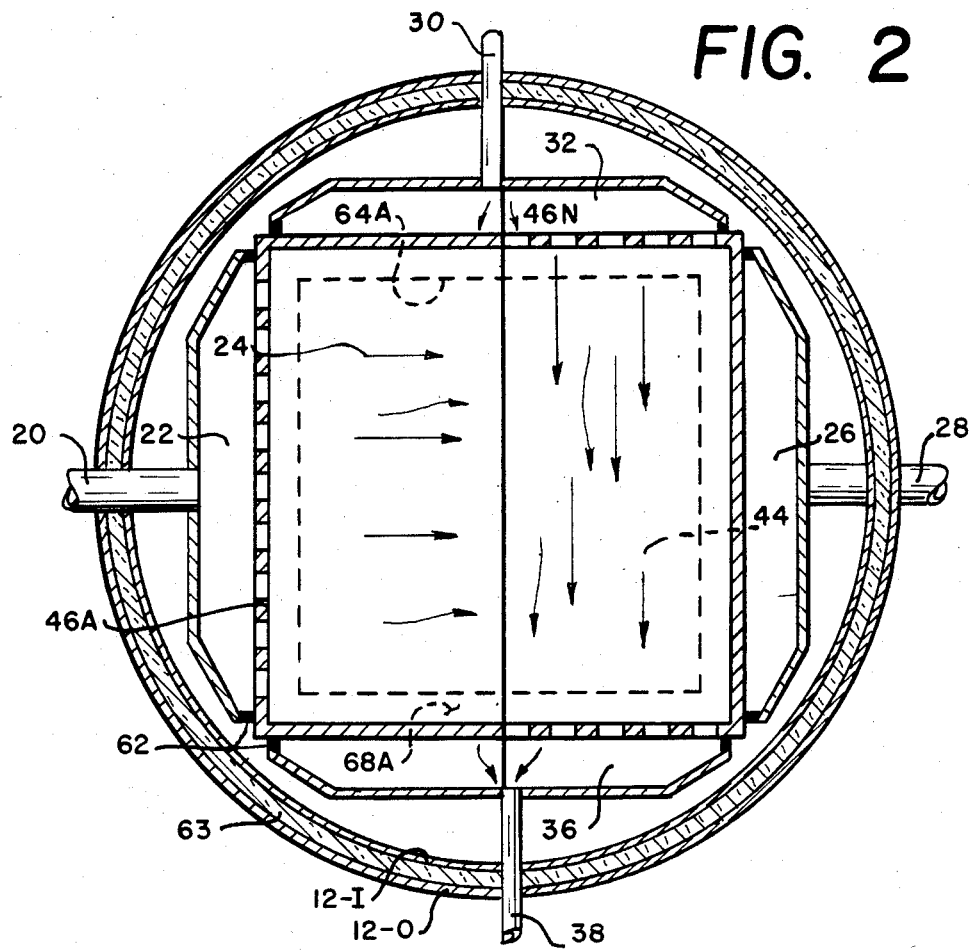
FIG. 2 is a sectional view as taken generally from line 2—2 in FIG. 1.

As illustrated in FIGS. 1 and 2 of the drawing, a fuel cell device 10 is illustrated having an exterior housing 12 which surrounds a core or stack 14 of individual fuel cells 16. Each fuel cell 16 is arranged so that flow means for fuel and oxidant gases are defined that cross one another, and manifolds are provided for common infeed and outfeed of the gases relative to the stacked fuel cells. Thus, an inlet line 20 for fuel gases is provided to inlet manifold 22 for flow via fuel flow means 24 to outlet manifold 26 and subsequently from the fuel cell via outlet line 28. Similarly, an oxidant inlet line 30 enters inlet manifold 32 for flow via oxidant flow means 34 (phantom only in FIG. 2) to outlet manifold 36 and then via outlet line 38 from the fuel cell.

Each individual cell 16A, 16B, 16N, etc. includes an anode 40A, 40N, etc. through which the fuel would pass via the flow means 24A, 24N, etc. and a cathode 42A, 42B, 42N, etc. through which the oxidant would pass via the flow means 34. Each anode 40 and cathode 42 are paired up adjacent one another, but are separated from one another along adjacent faces by means of an electrolyte material 44A, 44B, 44N, etc. disposed therebetween. Further, the opposite faces of the anode and cathode respectively are closed by means of the electrically conductive current collectors 46, 46A, 46M, 46N, etc. This anode 40, cathode 42, electrolyte 44 and current collector 46 sandwich of components together comprises each single fuel cell 16.

The cross directed flow means 24 and 34 for the fuel and for the oxidant respectively are interlayered, one each for each fuel cell 16. Adjacent pairs of fuel cells (16A, 16B, for example) are electrically connected together across a common current collector (46A, for example), so that the anode (40A) of one fuel cell (16A) is at a common potential with the cathode (42B) of the adjacent fuel cell (16B). This series connection of cells provides a cumulative electrical output at exposed and external negative and positive electrical terminals 52 and 54, respectively. The fuel cell illustrated is of a positive ground construction, with connector cable 56 connecting between the negative current collector 46 at one end of the fuel cell stack and the housing 12 at terminal 54, and cable 58 connecting between the positive current collector 46N at the opposite end of the fuel cell stack and the negative terminal 52 fitted through an electrically insulated feedthrough seal 60.

Each manifold (22 and 26, and 32, 36) extends generally over one entire side face of the core or stack 14 and the walls of the manifold are sealed relative to the core, as at gasket 62, by conventional means. The housing 12 would typically have inner and outer walls (12-I and 12-O, respectively) of a pressure confining capacity, and the stack 14 is isolated within the housing walls. Thermal insulation 63 in the housing walls reduces the heat loss from the unit to some acceptable level and holds the temperatures of the exterior housing surface sufficiently low for safety to the touch.

The construction details thus far described are fairly characteristic of molten carbonate fuel cells. The preferred embodiment of this invention will now be described.

Figure 3:
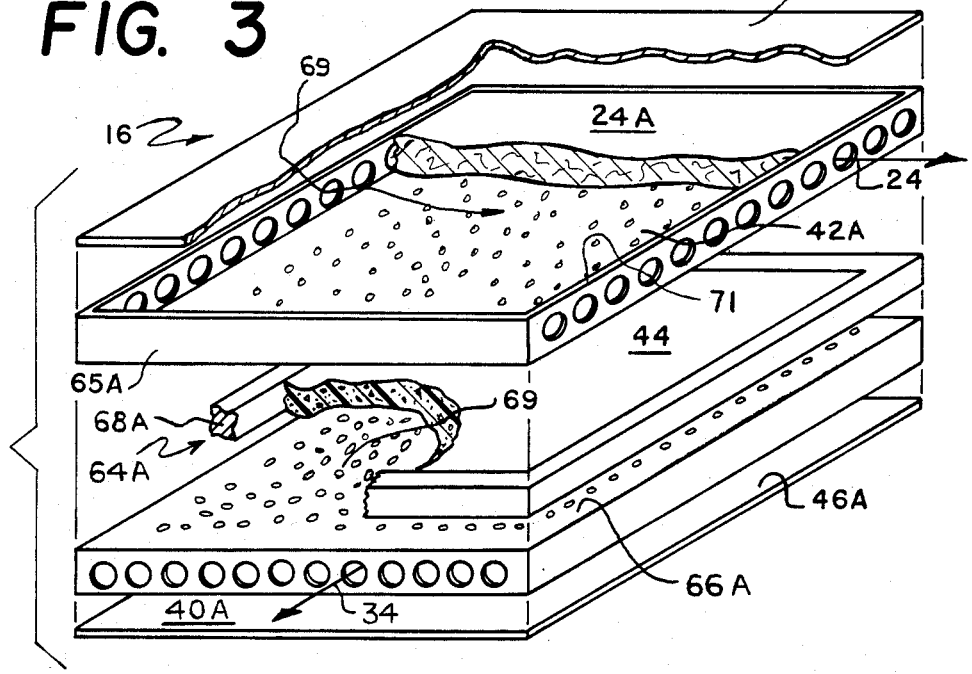
FIG. 3 provides enlarged perspective views of part of the fuel cell of FIGS. 1 and 2, showing the construction of the core thereof formed according to a preferred embodiment of the subject invention, the view being partly exploded for clarity of the disclosure.

As illustrated in FIGS. 1 and 3, the electrolyte 44 is confined within a unitary subassembly or modules 64A, 64B, 64N, etc. formed by a pair of sheets 65A, 65B, 65N, etc. and 66A, 66B, 66N, etc. sandwiching the opposite faces of the electrolyte matrix 44, and a bar-like spacer 68A, 68B, 68N, etc. disposed between the adjacent sheets 65, 66 annularly of the electrolyte material 44. In the embodiment illustrated, the central region 69 of each of the sheets 65, 66 within the spacer 68 is perforated. Moreover, the sheets have edges 71 and 72 that project beyond the spacer 68 on at least two opposite sides. The sheets 65, 66 can be formed of aluminized steel, and the spacer 66 can be formed of a refractory such as alumina ($Al_2O_3$) or lithium aluminate ($LiAlO_2$).

The alternate end edges 71, 72 of the separate aluminized sheets 65, 66 of the electrolyte module 64 project beyond the spacer 68 secured thereto and are respectively downturned or upturned to traverse the adjacent edges of the anode 40 and cathode 42 and are welded along the lapped or butted joint 71, 72 to the respective current collector 46. This provides a leak-proof seal against the infusion of the fuel gases to the cathode or the oxidant gases to the anode, at the manifold; but otherwise directly exposes those gases, viz., the fuel gases to the anode and the oxidant gases to the cathode. This is possible even with the complete exposure of one side face of the electrodes stack to the fuel and to the oxidant at the manifold areas.

As noted, the anode 40 and cathode 42 of any individual cell are separated from one another by means of the electrolyte module 64 which includes the spaced sheets 65, 66 of aluminized steel separated by the electrolyte material 44 itself. Inasmuch as the region of the aluminized sheets are perforated in this region 69 immediately adjacent the electrolyte material 44, the required ionic transfer of the electrolyte between the anode 40 and cathode 42 is possible across the electrolyte module sheets. Moreover, the adjacent anode and cathode electrode materials from adjacent cells are separated from one another by means of the impervious current collector 46.

The directions of fuel flow through the anodes 40 and oxidant flow through the cathodes 42 are indication by the arrows. The flow means (or matrices 24, 34) through the anodes and cathodes are made either by a series of small passageways (not shown) extended generally parallel to one another entirely through the electrode material, or alternatively, by pressing the cathode or anode electrode material into a plaque of a macroporous material (such as of Retimet) as taught in U.S. SIR No. H16 published Jan. 1, 1986 in the individual name of one of the coinventors herein, Thomas D. Kaun. The precise nature of these flow means or matrices is of no concern to the subject invention other than certain ends of the electrode material and/or flow means are exposed to the manifolds to allow for the throughflow of such fuel and oxidant gases.

The electrolyte module 64 is illustrated as having only the one pair of opposite ends 71 or 72 projected beyond the spacer 68 of alumina so as to be capable of being folded transversely thereto upwardly or downwardly past the side edges of the electrode material, either the anode or the cathode. This as noted above, allows for the welded connection at joints 71, 72 between the turned sheet and the adjacent current collector. It could, however, be possible to have the projected edge configuration on all four sides, to form a continuous welded joint peripherally of the current collector, and to provide a plurality of openings in the newly added pair of opposite edge projections to allow for gas flow therethrough between the adjacent manifold and the underlying electrode flow matrices.

The method of fabricating the disclosed fuel cell is also of importance. The first stage of fabrication is of the electrolyte modules 64, where the sheets 65, 66 are positioned on opposite sides of the alumina spacer 68 to sandwich it, while yet being separated from one another across the central perforated areas 69. The sheets, electrolyte matrix and spacer as thus positioned are then cured under a compressive force to generate moderate pressures (1000 psi, for example) and at an elevated temperature (for example 800° C.) for a short duration (perhaps one hour or less) whereupon the aluminum diffuse and the two sheets become bonded or fused to the spacer at their areas of overlap, while the central faces remain separated from one another. The electrolyte matrix (generally in the form of slurry comprised of lithium aluminate ($LiAlO_2$) and a tape casting binder) could alternatively be extruded into the confined region defined by the spaced sheets 65, 66 and annular spacer 68 through the perforations 69 in the upper sheet to fill this region. The composite assembly is then cured further with carbonates at an elevated but lower temperature (perhaps 700° C.) for a short duration (perhaps 1-3 hours). This establishes a unitized subassembly or electrolyte module 64 having a leakproof fused seal between the alumina spacers and the aluminized steel electrolyte module sheets, having some of the edges of the sheets that project beyond the annular spacer, having the spaced module sheets sandwich the opposite sides of the electrolyte, and having the electrolyte further surrounded and confined by the alumina spacer 68 itself fused to the module sheets.

The electrolyte module 64 is then stacked in place with anode and cathode bipolar electrode module, the anode material 40 being disposed adjacent one of the module sheets and the cathode material 42 being disposed adjacent the opposite module sheet. Many such electrolyte module assemblies can be made. The electrically conductive current collectors 46 would be disposed adjacent the outer exposed sides of the anode and the cathode electrodes, the projected end edges of the electrolyte module sheets would then be transversely folded to traverse the electrodes and lap or butt against the adjacent current collector, and would be welded across a leak-proof joint to the current collector. This in effect closes and seals the side edge of the underlying anode or cathode gas electrodes.

The individual fuel cells can be welded separately, an entire preassembled stack of such adjacent bipolar electrodes and electrolyte modules can be welded simultaneously by positioning in a proper fixture (not shown), or a combination of these procedures might be used where several cells might be formed together as a ministack, and then the several ministacks of fuel cells can be then joined together.

In a preferred assembly, the current collectors would be common to the anode of one cell and the cathode of the adjacent fuel cell, to be bipolar. With the electrode materials thus sandwiching the fused-together electrolyte modules and current collectors, the adjacent uncovered edges of the anode (or cathode) would be exposed to the inlet or outlet manifolds provided for the fuel (or oxidant) gases or waste products, operable for receiving the fuel (or oxidant) gas flows as required during the operation of the fuel cell.

In the alternative embodiment illustrated, there is no structural material provided within the confines of the annular spacer between the spaced module sheets that would prevent them from sagging into one another and contacting one another prior to the electrolyte matrix material (e.g., $LiAlO_2$) being doctored therebetween. However, a plurality of properly sized granular elements or fibers of solidified electrolyte matrix material might be positioned between the sheets to span between and abut the two adjacent module sheets. This would be done in the initial stages of fabrication of the unit when the adjacent module sheets are being positioned on the opposite sides of the annular spacer. Also, the electrolyte support matrix 44 itself may be initially formed in a dimensionally stable solid piece or plaque and be positioned within the confines of the annular spacer simultaneously with and upon the module sheets being sandwiched against the spacer and the same may then be cured under compressive pressures and at an elevated temperature (700°-800° C.) for a short duration (30-250 minutes) until the lapped edge joints between the spaced module sheets and spacer fuse together. Other sealing means to fuse together the electrolyte modules are anticipated (e.g., glass solder).

The electrolyte matrix 44 is ionically conducting but is electronically nonconducting. The alumina spacer 68 is both electronically and ionically nonconducting. The aluminized module sheet 46 may be electronically-conducting. Thus ionic transfers can only occur across the electrolyte matrix 44 between the adjacent cathode and anode materials of the same cell, and the adjacent stacked cells are connected together electrically in series but are ionically isolated from one another.

This invention would provide for improved reliability of the molten carbonate fuel cell by minimizing migration of the electrolyte from the cells. Moreover, the sealed connections across the spacer of the electrolyte module minimizes gas or electrolyte leakage therepast or the possibility of electrical shorts developing between the adjacent electrode materials. Moreover, the invention should reduce the dependence upon the stack compression in attempting to maintain the otherwise more conventional wet seals that contain and isolate the flowing gases. With the invention, it is estimated that the stack compression will be reduced from 60 psi to values in the order of 10 psi or less. Thus, problems involving mechanical creep (to reduce component thicknesses with time) would be alleviated.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of this invention in which an exclusive property or privilege is claimed are defined as follows:

1. A molten-electrolyte fuel cell device including a vertical, stacked array of individual fuel cells having at least four major vertical surfaces with vertical edge sections joining the vertical surfaces, the cells including anode and cathode electrodes separated by electrolyte material with the respective electrodes of all the cells being exposed along opposite and common vertical surfaces to provide access to fuel or oxidant gases and removal of waste gases therefrom, said fuel cell device comprising:

an array housing enclosing the array and having vertical sides cooperating with the edge sections of the array in a sealing relationship to define at least four isolated gas manifolds, a plurality of electrode holders arranged in spaced pairs, each of said electrode holders including a generally planar inner perforated section and first and second pairs of facing transverse laterial edge portions, said first pair of transverse lateral edge portions each having a plurality of apertures therein, wherein the inner perforated sections of adjacent pairs of electrode holders are in generally parallel alignment and the transverse lateral edge portions of adjacent pairs of electrode holders are directed away from one another;

spacer means disposed between and in contact with adjacent pairs of electrode holders for defining a substantially closed space within which is disposed the electrolyte;

dry sealing means disposed between and in sealed contact with said spacer means and adjacent pairs of electrode holders for confining the electrolyte between an adjacent pair of electrode holders; and means including first and second manifolds for providing fuel and oxidant gases respectively to said anode and cathode electrodes and third and fourth manifolds for removing waste gases respectively from said anode and cathode electrodes.

2. The fuel cell device of claim 1 including an insulated, external housing enclosing said array housing with tubular interconnections to each to said manifolds.

3. The fuel cell device of claim 1 wherein the array of cell enclosures are formed into a unitized fuel cell stack and enclosure for the individual cells.

4. The fuel cell device of claim 3 further comprising gasket means disposed in sealed engagement between each of said first, second, third and fourth manifolds and a respective vertical surface of the stacked array to isolate the fuel and oxidant gases and the waste gases from one another.

* * * * *